United States Patent [19]
Gilmour et al.

[11] Patent Number: 5,177,710
[45] Date of Patent: Jan. 5, 1993

[54] HIGH SPEED MULTIBEAM SIDELOOK SONAR WITH FEW ELEMENTS

[75] Inventors: George A. Gilmour, Severna Park; Bruce C. Mitchell, Ellicott City, both of Md.

[73] Assignee: Westinghouse Electric Corp., Pittsburgh, Pa.

[21] Appl. No.: 828,835

[22] Filed: Jan. 31, 1992

[51] Int. Cl.$^5$ ............................................. G01S 15/89
[52] U.S. Cl. ...................................................... 367/88
[58] Field of Search .......................................... 367/88

[56] References Cited

U.S. PATENT DOCUMENTS 3,585,578  6/1971  Fisher, Jr. .............................. 367/88

Primary Examiner—Daniel T. Pihulic
Attorney, Agent, or Firm—D. Schron

[57] ABSTRACT

A high speed multibeam sidelooking sonar system for processing acoustic signals including a transmitter for transmitting acoustic energy, and a hydrophone array for receiving reflected acoustic energy transmitted by the transmitting means and forming an ensonification region, including a plurality of hydrophone elements spaced at a predetermined distance. The transmitter includes a plurality of transmit transducers operating at different frequencies to divide the ensonification region into ensonification strips, such that the predetermined distance between the plurality of hydrophones is maximized. Therefore, the performance of the high speed multibeam sidelook sonar system is maximized at minimum range. Further, the high speed multibeam sidelook sonar system as described above minimizes fill time degradation with the plurality of transmit transducers, which increases range resolution and acoustical performance of the high speed multibeam sidelook sonar system at the minimum range.

21 Claims, 6 Drawing Sheets

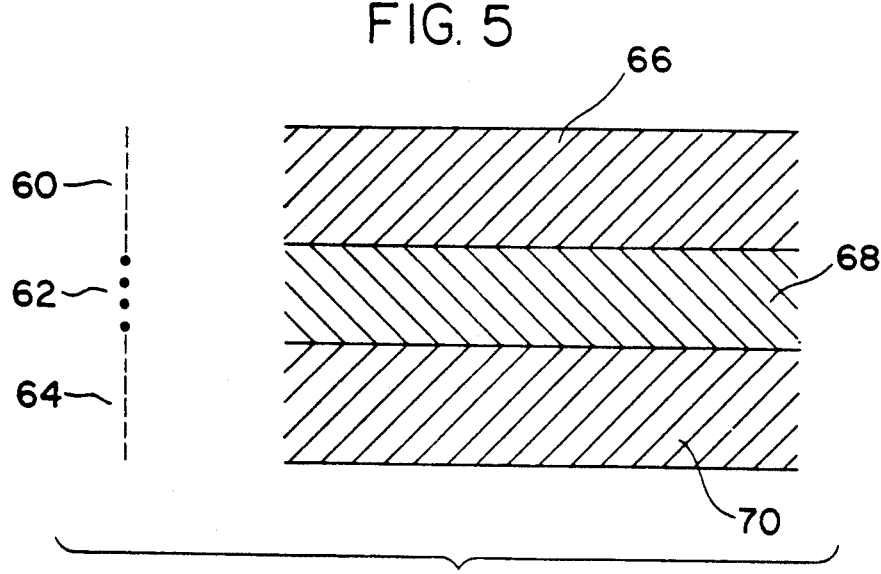
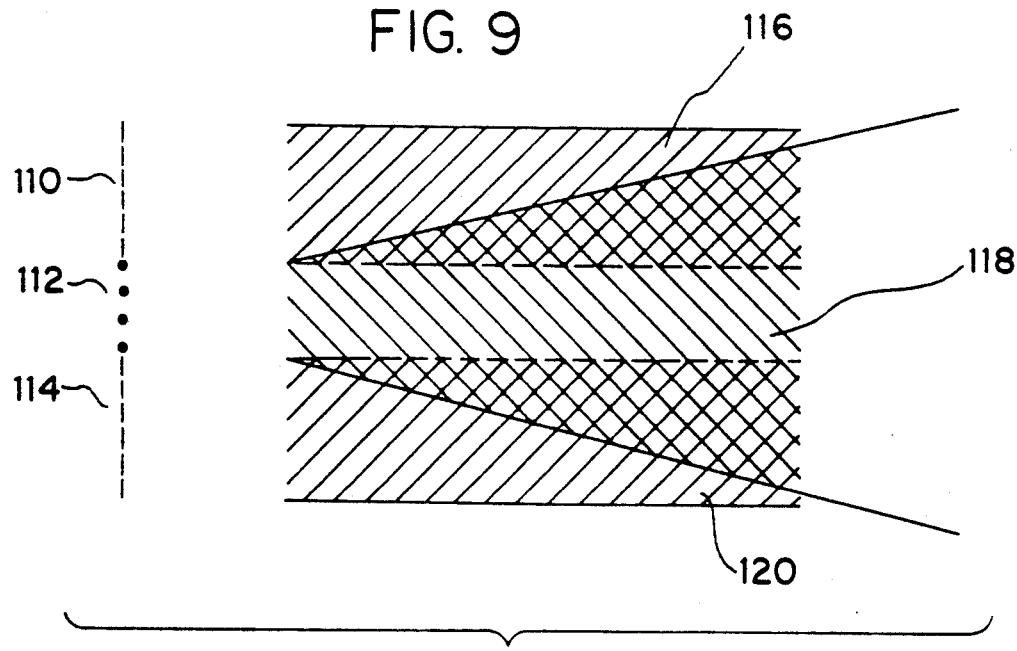

HIGH SPEED MULTIBEAM SIDELOOK SONAR WITH FEW ELEMENTS

FIELD OF THE INVENTION

The present invention is directed to a high speed multibeam sidelook sonar with few elements which utilizes multiple frequencies to divide up an ensonified region in order to increase the element spacing and utilizes multiple short projectors operating at different frequencies in order to minimize projector fill time degradation.

BACKGROUND OF THE INVENTION

The field of sonar (sound navigation and ranging) relates to the detection of targets in a body of water by reflecting sound waves off targets and processing the return signals. Many systems in the frequency range of 1 to 60 Khz have been developed for such detection.

High frequency sonars generate an image by "taking a picture with sound" and can be grouped into sidelooking and forward looking geometries. In sidelooking sonar, an underwater carrier vehicle towed by a surface vessel travels at a certain altitude above a target area such as the sea bottom. Sidelooking sonar apparatus on the carrier vehicle is operative to repetitively transmit acoustic pulses to the side of the carrier vehicle with two such pulses, a starboard pulse and a port pulse. The pulses ensonified areas in the form of strips.

Acoustic returns from elemental areas during their course of travel, are received by the sidelooking sonar apparatus which is then operable to form one or more receiver beams for examining the ensonified strips. The received acoustic energy is processed and displayed on a suitable display apparatus. With each pulse transmission and subsequent reception, a scan line is produced on the display to build up a picture of the sea bottom in a manner similar to the scanning of a conventional cathode ray beam in a television picture tube with the presentation being a pattern of highlights and shadows with objects outlined in such a way as to permit their identification.

However, high speed multibeam sidelooking sonar systems have two problems which affect their close-in performance:

(1) receiver grating sidelobes overlapping the transmit beam, and (2) excessive projector fill time degradation. Both of these problems have been solved by the device of the present application.

SUMMARY OF THE INVENTION

Accordingly, it is an object of this invention to provide an improvement in sonar apparatus.

It is another object of the invention to provide an improvement in high speed multibeam sidelooking sonar apparatus.

It is a further object of the invention to provide a high speed multibeam sidelooking sonar which utilizes multiple frequencies to divide up an ensonified region in order to increase element spacing.

It is yet another object of the invention to provide a high speed multibeam sidelooking sonar which utilizes multiple short projectors, operating at different frequencies, in order to minimize projector fill time degradation.

Other objects and advantages are achieved by a high speed multibeam sidelooking sonar including, among other things, transmitting means for transmitting acoustic energy, a hydrophone array for receiving reflected acoustic energy transmitted by said transmitting means and forming an ensonification region, including a plurality of hydrophones spaced at a predetermined distance, wherein said transmitting means includes a plurality of transmit transducers operating at different frequencies to divide the ensonification region into ensonification strips, such of said high speed multibeam sidelook sonar system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

FIG. 5 is a diagram illustrating the multiple frequencies of the high speed multibeam sidelooking sonar system of the present application, in a preferred embodiment.

FIG. 9 is a diagram illustrating the multiple frequencies of the high speed multibeam sidelooking sonar system of the present application, in another preferred embodiment.

DETAIL DESCRIPTION OF THE PREFERRED EMBODIMENTS

Figure 1:
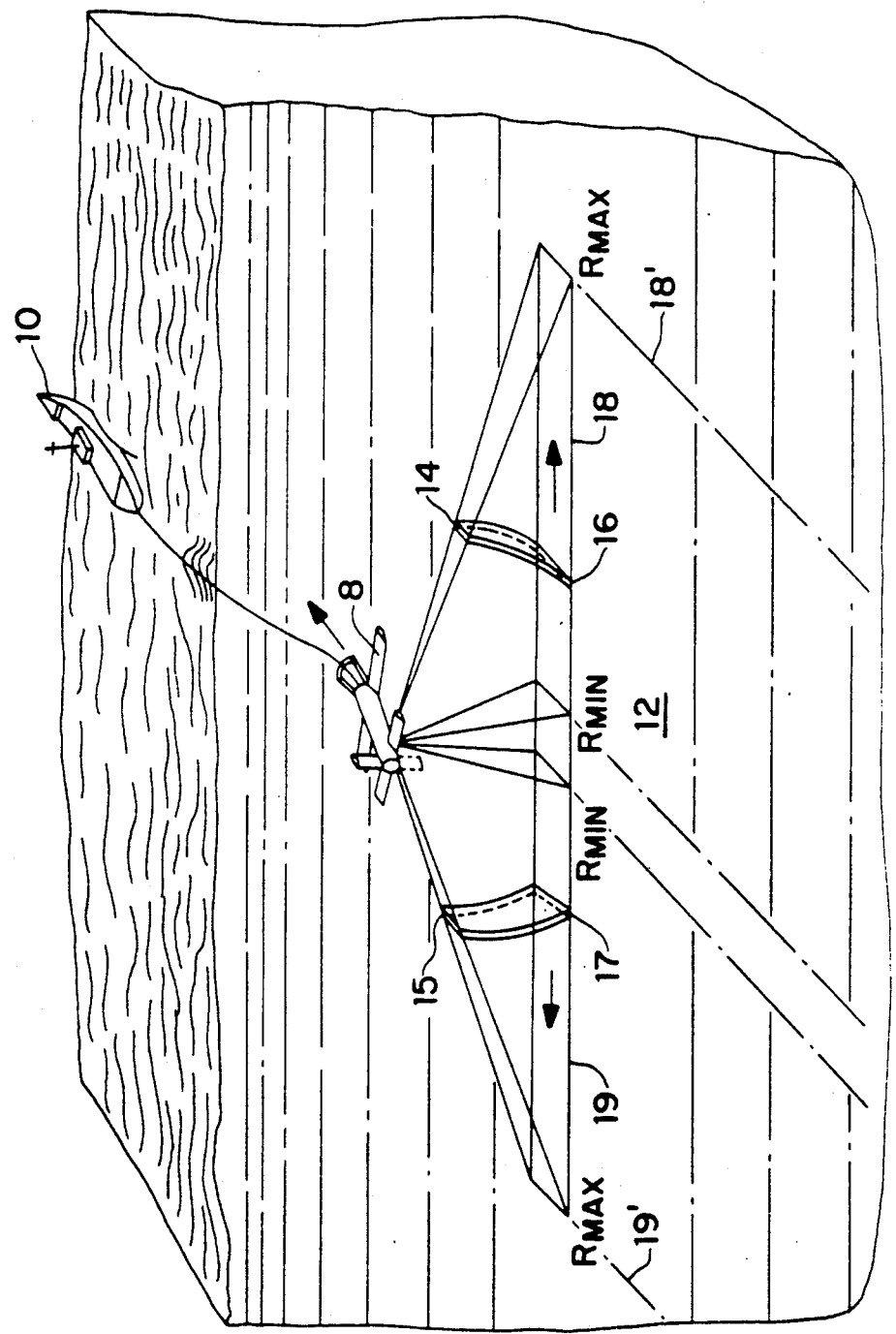
FIG. 1 is a diagram of a high speed multibeam sidelooking sonar geometry.

Prior to considering the preferred embodiment of the present invention, reference will be made to FIGS. 1 and 2 which provide further background information.

As noted, the field of sonar relates to the detection of targets in a body of water by reflecting sound waves off targets and processing the return signals. Many systems in the frequency range of 1 to 60 Khz have been developed for such detection. High frequency sonars generate an image by "taking a picture with sound". High resolution energy sonars can be grouped into sidelooking and forward looking geometries. A sidelooking geometry is depicted in FIG. 1. An underwater carrier vehicle 8 towed by a surface vessel 10 flies at a certain altitude above a target area such as the sea bottom 12. Sidelooking sonar apparatus on the carrier vehicle 8 is operative to repetitively transmit acoustic pulses to the side of the carrier with two such pulses, a starboard pulse 14 and a port pulse 15 being illustrated. The pulses impinge upon the sea bottom 12 as at 16 and 17 to sweep out respective en-sonified areas 18 and 19 from some minimum range $R_{min}$ to some maximum range $R_{max}$.

Acoustic returns from the elemental areas 16 and 17, during their course of travel, are received by the sidelooking sonar apparatus which is then operable to form one or more receiver beams for examining the ensonified strips. Areas 18 and 19 represent the strips presently being ensonified whereas the areas 18' and 19' represent the accumulation of previously ensonified strips from which information has been received.

The received acoustic energy is processed and displayed on a suitable display apparatus. With each pulse transmission and subsequent reception, a scan line is produced on the display to build up a picture of the sea bottom in a manner similar to the scanning of a conventional cathode ray beam in a television picture tube, with the presentation being a pattern of highlights and shadows with objects outlined in such a way as to permit their identification.

Figure 2:
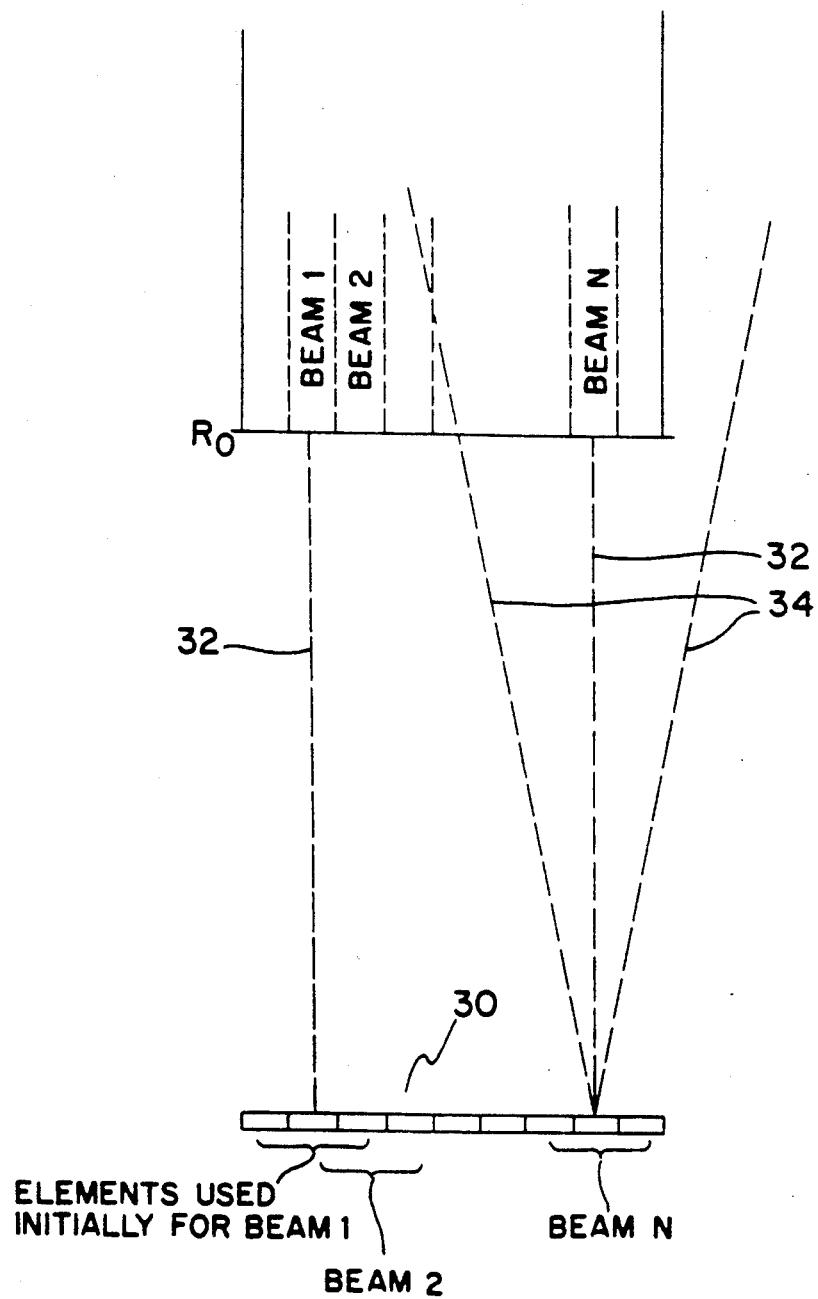
FIG. 2 is a diagram of one conventional high speed multibeam sidelooking sonar system.

A conventional high speed multibeam sidelooking sonar system operates is shown in FIG. 2. At minimum range, individual groups of hydrophone elements 30, spaced along an array, are used to form a contiguous set of beams 32 and first grating sidelobes 34 normal to the array. As range increases, additional elements are added to each group to maintain along track resolution for each beam. As shown in FIG. 2, at minimum range, $R_O$, three elements are used for beams 1 through N. At a range greater than $R_1$, four, five, and six elements would be used to form each individual beam. Also as shown in FIG. 2, each element is generally used simultaneously to form more than one beam. For example, element number 2 is the second element used in forming beam 1 and the first element used in forming beam 2.

Multibeam sidelooking sonars which are operated at high speed have two problems which affect close-in performance:

(1) receiver grating sidelobes overlapping the transmit beam, and (2) excessive projector fill time degradation. The receiver grating sidelobe problem will be addressed first.

Figure 3:
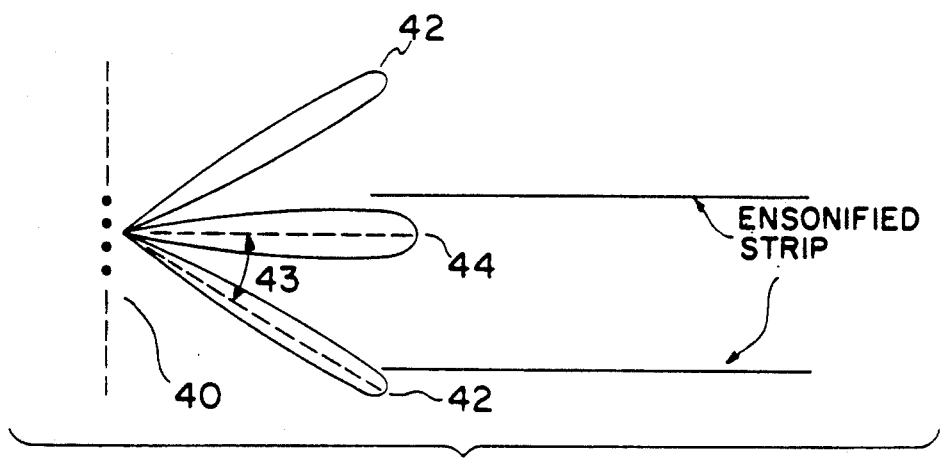
FIG. 3 is a diagram illustrating grating sidelobe considerations.

FIG. 3 illustrates a set of hydrophone elements 40 on 15 wavelength centers. First grating sidelobes 42 are formed at an angle 43 of 1/15 radians (3.8°) the main beam 44, which is the direction of beam steering. The minimum range for such a high speed multibeam sidelooking sonar (with a gap filler) would be about 5700 wavelengths. The first grating sidelobes 42 are centered 380 wavelengths from the main beam 44 at the minimum range. In order to avoid grating sidelobe problems, the set of multiple receive beams to be formed must take up less than 190 wavelengths. Further, the transmit pattern cannot fall off instantaneously, therefore, the received beams must take up something less than 380 wavelengths, for example, 340 wavelengths. Therefore, the maximum tow speed is limited to 340 wavelengths per ping, or about 12.5 knots. The only conventional way to increase the tow speed is to reduce the element spacing. For example, an array of 7.5 wavelength elements (as opposed to the 15 wavelength array discussed above) would have grating lobes at 1/7.5 radians from the main beams steering direction, and would support a speed of about 25 knots. However, a reduction in the element spacing requires a greater number of elements necessary to form an array of equivalent length. A greater number of elements also requires additional electronics to process data from a greater number of channels. The apparatus of the present application can support a speed of 25 knots without reducing the element spacing or requiring additional electronics as described above.

Figure 4:
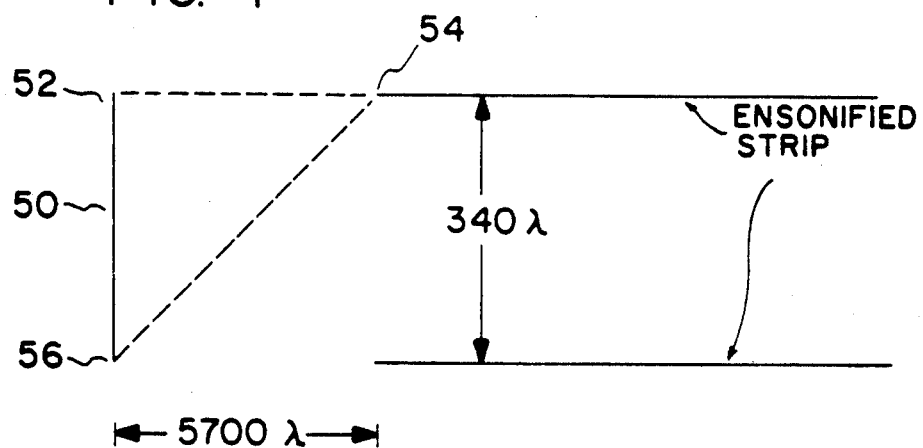
FIG. 4 is a diagram illustrating projector fill time considerations.

With respect to projector fill time, if a projection transducer is too long, the range resolution will be degraded, especially at minimum range. In the above case, where the goal was to ensonify a strip 340 wavelengths wide at a minimum range of 5700 wavelengths, a typical range resolution cell might be 28 wavelengths, which requires a pulse 56 wavelengths long. The projection transducer fill time geometry is shown in FIG. 4. Assuming a 10% degradation is acceptable, the distance from one end 52 of the projection transducer 50 to a corner of the ensonified region 54 can be no more than 5.6 (10%) wavelengths more than the distance from the other end 56 of the projection transducer 50 to the same corner 54, in order to avoid excessive fill time degradation. The maximum projection transducer length in this case is 188 wavelengths, which is too short to get a good nearfield rectangular transmit pattern with a width of 340 wavelengths.

The present invention obviates the limitations of the conventional system described above by utilizing multiple short projectors, which project multiple frequencies to divide up the ensonified region in order to maximize performance of a high speed multibeam sidelooking sonar, at minimum range.

The system of the present application utilizes multiple transmit transducers 60, 62, and 64, separated in frequency, in order to ensonify the desired rectangular pattern in strips 66, 68 and 70, as shown in FIG. 5. A single hydrophone array is used to form all beams, despite the difference in frequency, from the multiple transmit transducers 60, 62, and 64. Further, the individual transmit transducers are limited in length in order to avoid the fill time problems discussed above. The total projector length L, which should be equal to the width of the strip to be ensonified, is approximately:

$$L = (2 * R * FT)^{\frac{1}{2}}$$

where R is the minimum range of interest and FT is the maximum fill time degradation allowed. If, as in the example above, R=5700 wavelengths and FT=5.6 wavelengths, the projector length L, is 253 wavelengths. Therefore, the maximum tow speed is 253 wavelengths per ping per frequency. This translates to about 9.3 knots per frequency, or 18.6 knots for a two frequency system and 27.9 knots for a three frequency system. The three frequencies utilized should be separated by a guard band approximately equal to the bandwidth of the ping. The bandwidth of the ping is typically about 2% of the sonar frequency about 10% of the sonar frequency, which is well within the Q of the transducers.

Assuming the ensonified width per frequency is 253 wavelengths, the maximum element spacing can be estimated. The two grating sidelobes must now straddle the 253 wavelength width at the minimum range of 5700 wavelengths. If 300 wavelengths is selected as the grating sidelobe separation, in order to allow the projector pattern to fall off, the element separation is 19 wavelengths. A 760 wavelength array would require 40 elements if equal spacing were used, and would have a resolution of approximately 53 wavelengths out to a maximum range of 40,000 wavelengths. Using principles applicable to sparse element arrays, only the center few elements would need 19 wavelength spacing. The outer elements could be further apart, since they are only used at longer ranges, where a smaller grating angle will still avoid the ensonified region.

Figure 6:
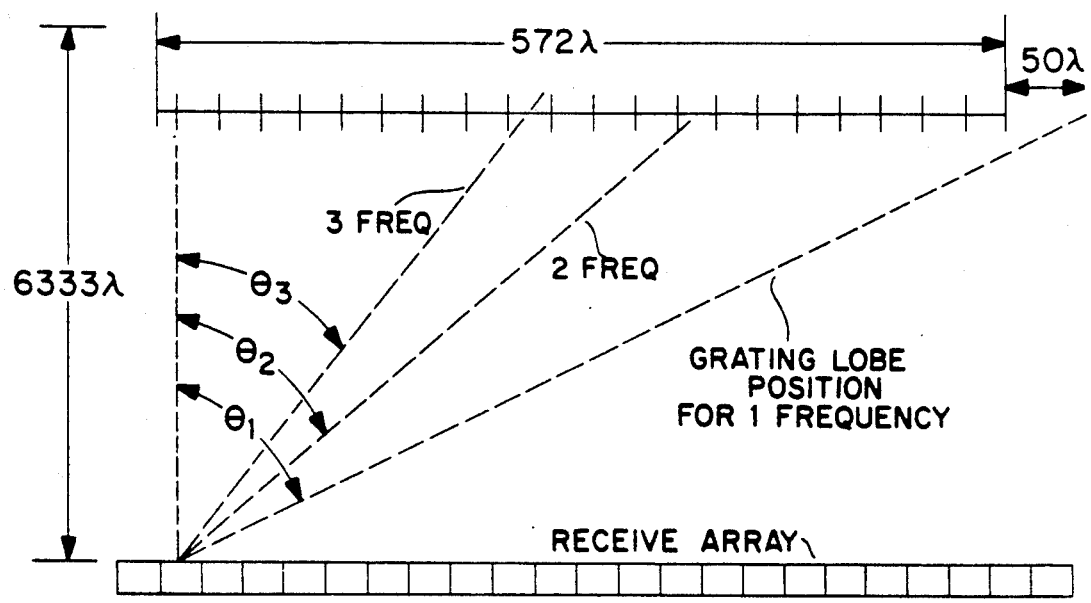
FIG. 6 is a diagram illustration grating sidelobe positioning as a function of the multiple frequencies.

In another preferred embodiment, a design altitude of 4480 wavelengths is desired and a speed of sound of 4900 feet per second is used. Utilizing the approach described above, the receiver grating sidelobes are kept out of the transmit pattern at minimum range for this altitude and the projector fill time is minimized. The minimum range is selected to be at a grazing angle of 45°, i.e., the minimum range equals the altitude times $\sqrt{2}$ which results in a minimum range of 6,333 wavelengths. The grating sidelobe positions are shown in FIG. 6 for the end beam, which is the worst case. FIG. 6 illustrates a minimum range of 6,333 wavelengths and a receive array whose length is approximately equal to the width of the area to be ensonified. In order to get the grating sidelobes down by about 15 db, it is necessary to place the grating sidelobe about 50 wavelengths outside the transmit pattern. If all receive beams are flooded with one transmit frequency then the grating sidelobe angle would be at least $\theta_1$, which equals 0.098 radians, which requires an element spacing no greater than $1/\theta_1$, which equals 10.2 wavelengths. This requires 61 elements per side for the array. If one half the received beams are flooded with one frequency and the other half of the receive beams are flooded with another frequency, then the grating sidelobe angle is reduced to angle $\theta_2$, which equals 0.053 radians, and the element spacing would be no greater than 18.85 wavelengths. This would require 33 elements per side for the array. In this case, the frequency used for the forward beams (the first half) would be different from that of the aft beams (the other half). If the main sidelobe were in the forward frequency zone, the grating sidelobe would be in the aft frequency zone (and vice versa) and could be filtered out. Carrying this one step further, the received pattern is broken into three frequencies. In this case, $\theta_3$ equals 0.037 radians and the element spacing can be no greater than 27.24 wavelengths, which requires 23 elements per side for the array. In addition to reducing the channels of electronics, the use of three frequencies simplifies the beamformer by allowing the use of element spacing which is equal to beam spacing.

In this embodiment, a single element can only be used to form beams that are within its beam width and, if the entire 27.24 wavelengths is filled with piezoelectric material, the element beam width is about 0.037 radians, which is 231 wavelengths at the nominal minimum range of 6,333 wavelengths. The minimum beam width that can be achieved at 6,333 wavelengths is about 0.004 radians, which equals 26.12 wavelengths, on the center beams where approximately nine elements are used. The two end beams will be centered on elements next to the end, therefore, only about six elements can be used on the two end beams, resulting in a beam width of 38 wavelengths at the nominal minimum range. The beam width improves to 33 wavelengths on the next pair of beams, then 28.4 wavelengths on the next pair. As the pairs move closer to the center beam, the beam width continues to decrease until 9 elements are used per beam.

Figure 7:
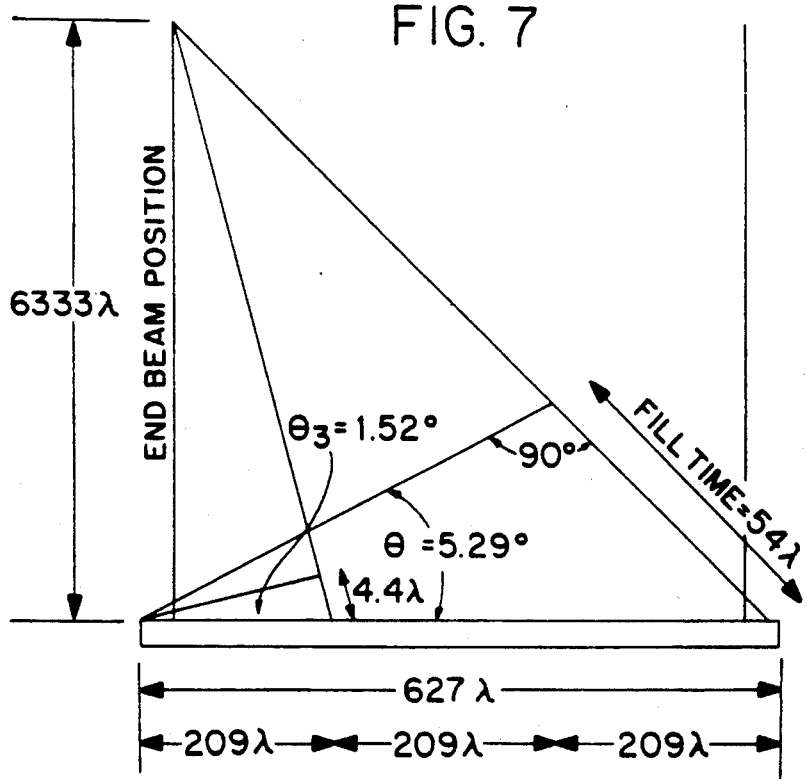
FIG. 7 is a diagram illustrating projector fill time as a function of multiple frequencies.

Range resolution can also be degraded if the return signal takes more than a pulse length to pass the elements in use. This is not a problem for the receiver described above, since only 9 elements were used at the nominal minimum range of 6,333 wavelengths. However, it would be a serious problem for a single frequency transmit system with a long nearfield transmitter. The worst problem is at minimum range as shown in FIG. 7. If a 627 wavelength transmit array is used in a single frequency system, then $\theta_1 = 5.29°$ and the distance to the end beam position is 54 wavelengths more from one end of the array then from the beam center position. This would degrade the range resolution cell by half of this value, i.e., 27 wavelengths. However, as disclosed above, the three frequency design has three 209 wavelength transmit arrays mounted end to end. In this case, $\theta_3 = 1.52°$ and the excess in range from one end to the beam center position is 4.4 wavelengths causing a 2.2 wavelength degradation in the range resolution cell. This degradation is less than one tenth of the degradation found in conventional high speed multibeam sidelooking sonar systems.

Figure 8:
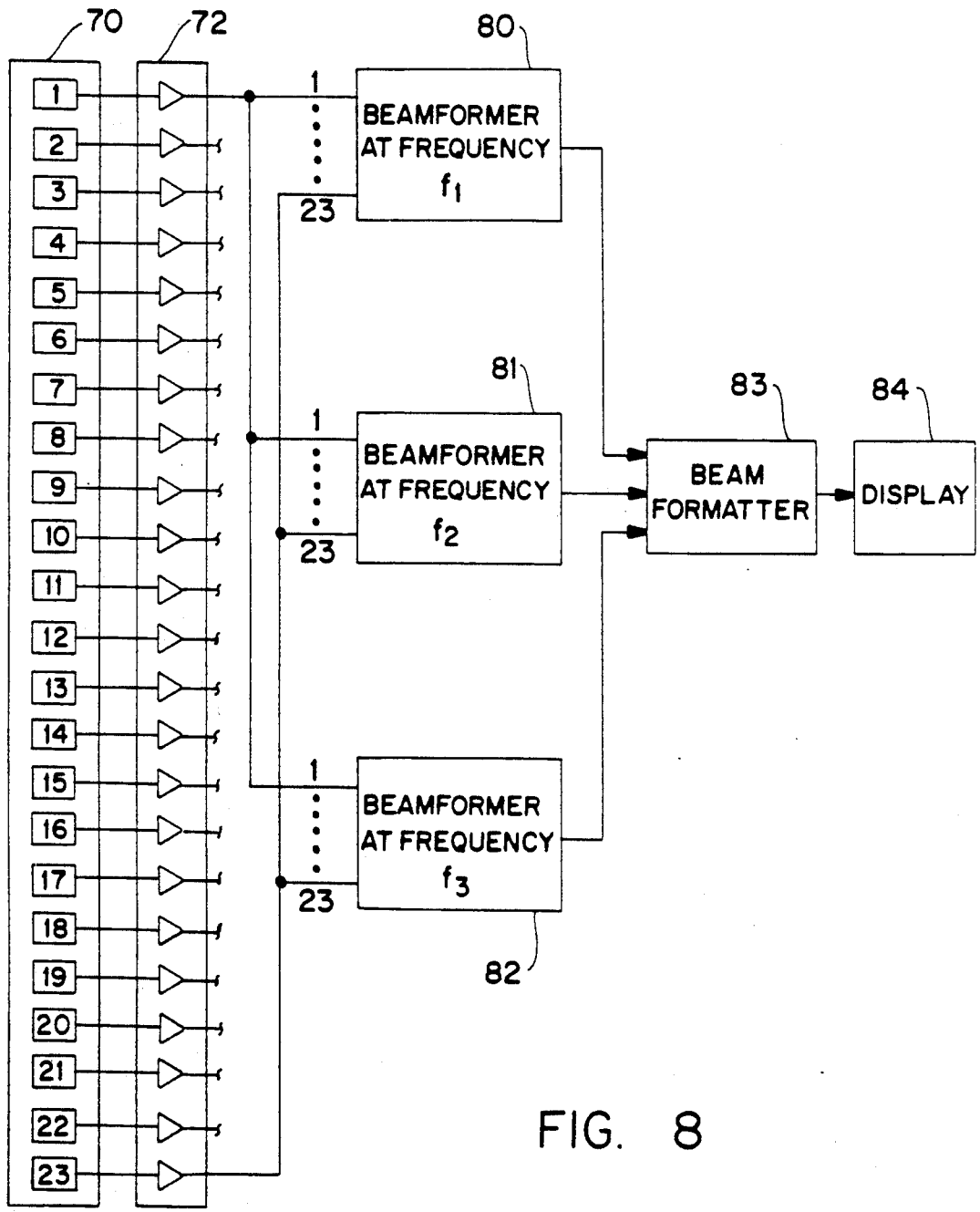
FIG. 8 is a diagram illustrating the processing performed by the high speed multibeam sidelooking sonar system of the present application.

Further, the energy transmitted by the three 209 wavelength transmit arrays is reflected off various submerged objects and received on individual groups of hydrophone elements 70, as shown in FIG. 8. Outputs of these hydrophone elements, are then preamplified, beamformed and detected in order to produce a CRT display. The outputs of hydrophone elements 70 are coupled to a set of time varied gain preamplifiers 72. The outputs of this set of time varied gain preamplifiers 72 are then provided to three beamformers 80, 81, and 82, each of the type used in the prior art. Filtering is performed to restrict each beamformer to a specific frequency. Thus, beamformer 80 forms beams at frequency f1, beamformer 81 at frequency f2 and beamformer 83 at frequency f3. The beams from the three beamformers are placed in the proper order by beam formatter 83 for display on display apparatus 84.

In another preferred embodiment, the ensonified width per frequency is kept narrow at minimum range, however, one frequency strip is allowed to spread, for example the center frequency strip shown in FIG. 9, at larger ranges. The system of the present application utilizes multiple transmit transducers 110, 112 and 14, separated in frequency in order to ensonify the rectangular pattern using areas 116, 118 and 120. A single hydrophone is again used to form all beams despite the difference in frequency, from the multiple transmit transducers 110, 112 and 114. This allows the best frequency to be used on all beams at long range.

In another preferred embodiment, all frequencies overlap at long range and the extra band width is used to reduce speckle.

The invention being thus described, it will be obvious that the same may be varied in many ways. Such variations are not to be considered a departure from the spirit and scope of the invention, and all such modifications as will be obvious to one skilled in the art, are intended to be included within the scope of the following claims.

What is claimed:

1. A multibeam sidelook sonar system comprising:
   transmitting means for transmitting acoustic energy;
   a hydrophone array for receiving reflected acoustic energy transmitted by said transmitting means and forming an ensonification region, including a plurality of hydrophones spaced at a predetermined distance;
   wherein said transmitting means includes a plurality of transmit transducers operating at different frequencies to divide the ensonification region into ensonification strips, such that the predetermined distance between the plurality of hydrophones is maximized, thereby maximizing performance of said multibeam sidelook sonar system at a minimum range.

2. The multibeam sidelook sonar system of claim 1, wherein said hydrophone array forms a plurality of receive beams with first grating sidelobes which are outside the ensonification region at a minimum range of the multibeam sidelook sonar system.

3. The multibeam sidelook sonar system of claim 2, wherein each of the plurality of transmit frequencies is separated by a guard band.

4. The multibeam sidelook sonar system of claim 3, wherein a number of the plurality of transmit transducers is three.

5. The multibeam sidelook sonar system of claim 2, wherein a minimum number of channels are necessary to process the plurality of hydrophons.

6. The multibeam sidelook sonar system of claim 2, wherein said hydrophone array is a sparse hydrophone array.

7. The multibeam sidelook sonar system of claim 2, wherein at least one of the plurality of transmit transducers is permitted to spread in azimuth, at ranges greater than a minimum range, thereby permitting a best frequency to be used at each range.

8. The multibeam sidelook sonar system of claim 1, wherein fill time degradation of the plurality of transmit transducers is minimized, thereby improving range resolution and acoustical performance of said high speed multibeam sidelook sonar system at the minimum range.

9. The multibeam sidelook sonar system of claim 8, wherein a number of the plurality of transmit transducers is three.

10. The multibeam sidelook sonar system of claim 8, wherein at least one of the plurality of transmit transducers is permitted to spread in azimuth, at ranges greater than a minimum range, thereby permitting a best frequency to be used at each range.

11. A method of processing acoustic signals in a multibeam sidelook sonar system such that acoustical performance of the multibeam sidelook sonar system at a minimum range is optimized comprising the steps of:
(a) transmitting acoustic energy at a plurality of frequencies using a plurality of transmit transducers;
(b) receiving reflected acoustic energy on a hydrophone array including a plurality of hydrophones;
(c) processing the reflected energy into a plurality of ensonification strips, one for each of the plurality of frequencies, in order to obtain an ensonification region such that the acoustical performance of the sidelook sonar system at a minimum range is optimized.

12. The method of claim 11, wherein said step (c) further includes forming a plurality of receive beams with first grating sidelobes which are outside the ensonification region at a minimum range of the multibeam sidelook sonar system.

13. The method of claim 12, wherein each of the plurality of transmit frequencies is separated by a guard band.

14. The method of claim 13, wherein a number of the plurality of transmit transducers is three.

15. The method of claim 12, wherein a minimum number of channels are necessary to process the plurality of hydrophones.

16. The method of claim 15, wherein the number of channels and the number of the plurality f hydrophones are equal.

17. The method of claim 12, wherein said hydrophone array is a sparse hydrophone array.

18. The method of claim 12, wherein at least one of the plurality of transmit transducers is permitted to spread in azimuth, at ranges greater than a minimum range, thereby permitting best frequency to be used at each range.

19. The method of claim 11, wherein fill time degradation of the plurality of transmit transducers is minimized, thereby increasing range resolution and acoustical performance of said multibeam sidelook sonar system at the minimum range.

20. The method of claim 19, wherein a number of the plurality of transmit transducers is three.

21. The method of claim 19, wherein at least one of the plurality of transmit transducers is permitted to spread in azimuth, at ranges greater than a minimum range, thereby permitting a best frequency to be used at each range.

* * * * *